W. Mann,

Corrugating Sheet Metal.

No. 101,750.   Patented Apr. 12, 1870.

WITNESS
Percival Beckett
Jno. P. Clarke

INVENTOR.
William Mann.

United States Patent Office.

WILLIAM MANN, OF NEWCASTLE, PENNSYLVANIA.

Letters Patent No. 101,750, dated April 12, 1870.

IMPROVED MACHINE FOR CORRUGATING SHEET METAL.

The Schedule referred to in these Letters Patent and making part of the same.

*To all whom it may concern:*

Be it known that I, WILLIAM MANN, of Newcastle, in the county of Lawrence and State of Pennsylvania, have invented certain new and useful Improvements in Machines for Corrugating Sheet Metal; and I do hereby declare that the following is a full, clear, and exact description thereof, reference being had to the accompanying drawings and to the letter of reference marked thereon, which form a part of this specification.

The nature of my invention consists in the construction of a machine whereby sheet metal can be crimped or corrugated to the form required for roofing and other purposes.

In the accompanying drawings—

Figure 1:
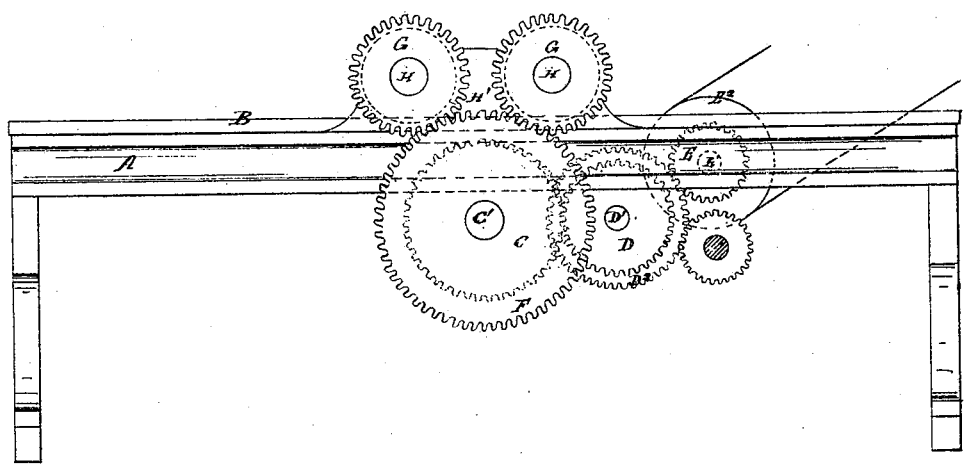

Figure 1 is a side elevation of my invention.

Figure 2:
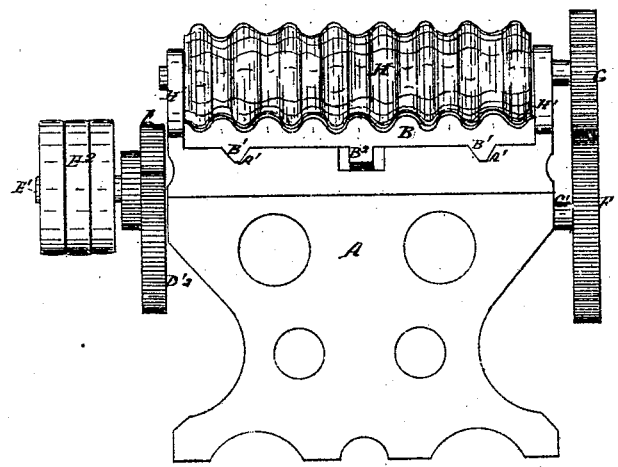

Figure 2, a rear view thereof.

Letters of reference denote like parts.

A bed-frame, A, of suitable construction supports and carries the devices used, said frame A having grooves A' at its upper part and running longitudinally therewith, forming bearings for a bed-plate, B, of suitable material, its upper face being curved and formed to the required shape of corrugated sheet metals, and having underneath slides B¹, which rest in the before-named grooves A'. Said plate B is furthermore furnished with an ordinary geared rack, B², running longitudinally with and being between said slides B¹.

Engaging the teeth of said rack B² is an ordinary geared wheel, C, affixed to a shaft, C', laying underneath and transversely with said frame A, to which it is attached by means of ordinary bearings in which said shaft C' revolves.

The said gear-wheel C engages the teeth of an ordinary gear-wheel, D, affixed to a shaft, D¹, revolving in suitable bearings affixed to said frame A, the outer extremity of said shaft D¹ being provided with an ordinary gear-wheel, D², which fits into the teeth of an ordinary gear-wheel, E, affixed to a driving-shaft, E¹, parallel to said shaft D¹, and revolving in suitable bearings attached to said frame A, said shaft E¹ being provided at its outer extremity with the ordinary driving-pulleys E², similar in construction and adaptation to those used on an ordinary metal planing-machine.

The before-named shaft C' is provided at its outer extremity with a gear-wheel, F, which engages in the teeth of two ordinary gear-wheels, G and G, affixed to the extremities of two rolls H H, said rolls being above and laying transversely with said bed-plate B.

From the said frame A are bearings H' in which said rolls revolve, the shape of said rolls H H corresponding with the curved form of the upper portion of the said plate B, and so arranged that there will be a slight partition between them.

If required, any ordinary screw or other lifting-gear can be attached to said rolls H H, by which they can be raised or depressed to any required point.

The table or plate B and the frame A are provided with the ordinary catches and levers usually in use on metal planing-machines, by the manipulation of which the belt which drives the machine is thrown on and off the several pulleys E², the whole being so arranged that, by the revolution of the driving-shaft E¹, the whole of the described machinery is set in motion.

Sheet metal being placed on the bed-plate B, in its forward motion it carries the metal to the rolls H, by whose action it is pressed down into the curves of the bed-plate, and, having passed through the rolls, is a completed plate.

By the operation of the catches and levers operating on the driving-belt, the motion of the table B is reversed and returns to its original position, and is ready for the manipulation of another plate.

Having thus described my invention,

What I claim as new, and desire to secure by Letters Patent, is—

The combination of the plate B and the rolls H H with the gearing described, when the parts are constructed as and for the purpose set forth.

In testimony that I claim the foregoing as my own, I affix my signature in presence of two witnesses.

WILLIAM MANN.

Witnesses:
PERCEVAL BECKETT,
A. L. FRANCE.